US012668003B2

(12) United States Patent (10) Patent No.: US 12,668,003 B2
Guj et al. (45) Date of Patent: Jun. 30, 2026

(54) PANEL MEMBER PRODUCTION LINE

(71) Applicant: Dow Global Technologies LLC,
Midland, MI (US)

(72) Inventors: Luca Guj, Horgen (CH); Colmar Wocke, Horgen (CH); Mirella Coroneo, Correggio (IT); Vanni Parenti, Campagnola (IT)

(73) Assignee: Dow Global Technologies LLC,
Midland, MI (US)

( * ) Notice: Subject to any disclaimer, the term of this patent is extended or adjusted under 35 U.S.C. 154(b) by 443 days.

(21) Appl. No.: 17/597,516

(22) PCT Filed: Sep. 1, 2020

(86) PCT No.: PCT/US2020/048890
§ 371 (c)(1),
(2) Date: Jan. 10, 2022

(87) PCT Pub. No.: WO2021/046022
PCT Pub. Date: Mar. 11, 2021

(65) Prior Publication Data
US 2022/0250289 A1 Aug. 11, 2022

(30) Foreign Application Priority Data
Sep. 6, 2019 (IT) ......................... 102019000015728

(51) Int. Cl.
*B29C 44/32* (2006.01)
*B05C 5/02* (2006.01)
(Continued)
(52) U.S. Cl.
CPC ............ *B29C 44/321* (2016.11); *B05C 5/027* (2013.01); *B29C 44/461* (2013.01);
(Continued)

(58) Field of Classification Search
CPC ..... B05C 5/027; B29C 44/461; B29C 44/468; B29C 44/326; B29C 48/695; B29C 48/70; B29C 48/705; B05B 1/14; B05B 1/20
See application file for complete search history.

(56) References Cited

U.S. PATENT DOCUMENTS 4,303,728 A 12/1981 Houdek et al.
4,572,435 A 2/1986 Thompson et al.
(Continued)

FOREIGN PATENT DOCUMENTS

CN 106626216 A 5/2017
DE 19525664 A1 * 1/1997 ........... B29C 44/461
(Continued)

OTHER PUBLICATIONS

Thermal Press International, Heat Sealing in Manufacturing: Offering Value across Multiple Industries, https://thermalpress.com/heat-sealing-in-manufacturing-offering-value-across-multiple-industries/ (Year: 2025).*

(Continued)

*Primary Examiner* — Susan D Leong
*Assistant Examiner* — Jennifer L Groux
(74) *Attorney, Agent, or Firm* — Warner Norcross + Judd LLP

(57) ABSTRACT

A manufacturing line for manufacturing a multilayer foam panel member including: (a) a storage; (b) a dosing system for flowing the components of the foam-forming fluid reactive mixture to a chamber for mixing the components; (c) a flexible fluid dispensing device; (d) a means for flowing the foam-forming fluid through the flexible fluid dispensing device to dispense the foam-forming fluid; (e) a moving first bottom sheet substrate for receiving the foam-forming fluid; (f) a means for allowing the foam-forming fluid to react; (g) a panel structure comprising the foam material disposed
(Continued)

inbetween the top metal sheet and the bottom metal sheet; (h) a means for curing the foam material; and (i) a cutting means; and a process for manufacturing a multilayer foam panel member using the above manufacturing process.

15 Claims, 7 Drawing Sheets

(51) Int. Cl.

| | |
|---|---|
| *B29C 44/46* | (2006.01) |
| *B29C 44/52* | (2006.01) |
| *B29K 75/00* | (2006.01) |
| *B29K 105/04* | (2006.01) |
| *B32B 5/20* | (2006.01) |
| *B32B 15/04* | (2006.01) |

(52) U.S. Cl.
CPC ............ *B29C 44/468* (2013.01); *B29C 44/52* (2013.01); *B32B 5/20* (2013.01); *B32B 15/046* (2013.01); *B29K 2075/00* (2013.01); *B29K 2105/04* (2013.01); *B32B 2250/03* (2013.01); *B32B 2250/40* (2013.01); *B32B 2266/0278* (2013.01); *B32B 2307/304* (2013.01); *B32B 2607/00* (2013.01)

(56) References Cited

U.S. PATENT DOCUMENTS

| | | | | |
|---|---|---|---|---|
| 4,572,865 | A | * | 2/1986 | Gluck ........................ B32B 5/18 |
| | | | | 264/258 |
| 6,431,695 | B1 | | 8/2002 | Johnston et al. |
| 7,040,555 | B2 | | 5/2006 | Miinalainen et al. |
| 7,575,635 | B2 | | 8/2009 | Perttila et al. |
| 9,643,358 | B2 | | 5/2017 | Lewis et al. |
| 9,718,223 | B2 | | 8/2017 | Koster et al. |
| 11,092,977 | B1 | * | 8/2021 | Coleman .................. G02B 3/12 |
| 2007/0197674 | A1 | * | 8/2007 | Jennings ............ C08G 18/7664 |
| | | | | 521/172 |
| 2007/0267443 | A1 | * | 11/2007 | Rub ...................... B29C 44/326 |
| | | | | 222/145.5 |
| 2008/0145544 | A1 | * | 6/2008 | Schamberg ........... B29C 44/461 |
| | | | | 427/373 |
| 2009/0098237 | A1 | | 4/2009 | Tadani et al. |
| 2010/0080900 | A1 | | 4/2010 | Geraedts et al. |
| 2014/0017412 | A1 | | 1/2014 | Schoen et al. |
| 2016/0002428 | A1 | | 1/2016 | Kuroda et al. |
| 2017/0285619 | A1 | | 10/2017 | Brennan et al. |
| 2019/0358869 | A1 | | 11/2019 | Koester et al. |

FOREIGN PATENT DOCUMENTS

| | | | |
|---|---|---|---|
| EP | 0032052 | A1 | 7/1981 |
| EP | 0096453 | A2 | 12/1983 |
| EP | 2125323 | B1 | 8/2015 |
| EP | 2234732 | B1 | 9/2015 |
| GB | 1279007 | A | 6/1972 |
| JP | 5154932 | A | 6/1993 |
| JP | 2006142125 | A | 6/2006 |
| JP | 05378680 | B2 | 12/2013 |
| WO | 2005118240 | A1 | 12/2005 |
| WO | 2014117823 | A1 | 8/2014 |
| WO | 2017121894 | A1 | 7/2017 |
| WO | 2018141731 | | 8/2018 |

OTHER PUBLICATIONS

PCT/US2020/048890, International Search Report and Written Opinion with a mailing date of Nov. 17, 2020.

Office Action from corresponding Chinese Application: 202080060939.0 with a mailing date of Jul. 20, 2023.

\* cited by examiner

PANEL MEMBER PRODUCTION LINE

FIELD

The present invention relates to a production line for producing a multilayer panel member; and more specifically, the present invention relates to a continuous or discontinuous production line for producing a foam sandwich panel member.

BACKGROUND

Polymeric foams, in particular polyurethane foams, are well known. In general, the preparation of a polyurethane foam requires the mixing of reactive chemical components, such as a polyol and an isocyanate, in the presence of normally used additives such as a suitable catalyst, a surfactant or cell growth control agent, and a physical and/or chemical blowing agent which permits the blowing of the foam.

In a continuous process for producing a rigid foam, and particularly in the production of rigid foams for manufacturing a foam panel structure, as currently practiced on conventional machines, it is common practice to spread or pour, via a dispenser or dispensing device, a thin layer of a reactive mixture of the foam-forming components, in a liquid state, in between a bottom (or lower) sheet substrate (one outer layer) and a top (or upper) sheet substrate (another outer layer) while the substrates are moving for example in a lateral or horizontal direction.

Then, as the reactive mixture moves laterally with the bottom sheet substrate, the foam is allowed to start to rise freely, due to the reaction between the chemical components and the effect of the blowing agent, until the expansion of the foam reaches and contacts the top sheet substrate; and the foam forms a panel structure integrally attached to the top sheet substrate and the bottom sheet substrate. The foam in the panel structure is then allowed to cure; and thereafter, the panel structure is cross-sawn into panels. The foam composite panel structure typically includes, for example, a polyurethane resin (PUR) foam core or a polyisocyanurate resin (PIR) foam core. The foam core and outer layers of the panel often are also called sandwich elements or sandwich panels. A common process for the production of a composite panel structure composed of metallic outer layers with a core of foam, as generally described above, includes for example, a double band lamination (DBL) process. And, depending on the type of facing (one of the outer layers of the panel) on the panel, DBL can be distinguished in rigid-faced DBL (RF-DBL) and flexible-faced DBL (FF-DBL).

As aforementioned, the DBL process apparatus includes: (1) a lower moving sheet of a desired substrate; (2) an upper sheet of a desired substrate; and (3) a dispenser for applying a reactive foam-forming composition, which can be an emulsion, onto the lower moving sheet of the apparatus. And in general the DBL process includes the steps of: (I) providing a reactive foam-forming composition by mixing: (a) gases, i.e. blowing and nucleation agents, with (b) reacting liquids, for example, a mixture of a polyol and an isocyanate, to obtain a reactive emulsion wherein the reacting liquids in the emulsion ultimately react to form the final PUR foam or PIR foam inbetween the upper (top) and lower (bottom) sheet substrates; and (II) distributing the above obtained emulsion onto the lower moving sheet of the DBL process equipment via a dispenser (this step (II) can also be referred to as a "laydown" step). As the emulsion is distributed on the lower sheet substrate, the gases (blowing and nucleating agents) nucleate and expand via bubbles leading to the formation of the final foam that fills the gap between the two sheets.

In general, a DBL process includes a dispenser means, which is typically a hard solid device with orifices; such dispensers are known in the art as a "poker" or a "rake". The dispenser is used to distribute the PUR or PIR emulsion mixture throughout the width of the lower moving sheet substrate where the foam continues to react and polymerizes between the lower and upper sheets. In a short time, the foam cures to form an integral multi-layer (e.g., a three-layer) foamed panel structure. Then, as is known in the art, the formed multi-layer foamed structure is cut into blocks or sections (or "panels") of the desired length to form the panel products.

Using a RFDBL process requires that the dispenser or dispensing device used in the process satisfy a strict set of requirements including, for example: (1) a good quality of the top surface wherein the dispenser has to provide a uniform distribution of the foam-forming reactive mixture through the panel width leading to a good aesthetic quality of the top facing sheet substrate; (2) a good working dispenser with a long operational life to provide fewer stops of a continuous process. In general, a normal operational life requirement for the dispenser is half a production shift, i.e. approximately (~) 4 hours (hr). The operational life of the dispenser is mainly driven by fouling of the reactive mixture that partially or completely obstructs the flow within the dispenser ducts or passageways; (3) a good flexibility wherein the dispenser can serve a broad range of emulsion viscosities and flow rates; and (4) a lower dispenser cost since the dispenser article is an additional cost and such cost needs to be kept low given the fact that these devices are disposable and the current lifetime is around 4 hr.

Heretofore, a rigid distribution dispenser (also referred to as a "rake") such as a hard, unflexible, solid block or structure (e.g., a rake made of a metal pipe with holes or of any rigid material); for example produced by a conventional injection molding process has been used to distribute a reactive mixture to form a foam product. Developments in the field of manufacturing a foam panel typically are directed only to the geometry of a dispensing device and not to technology directed to the fabrication of the dispensing device. In addition, the problem of dispenser lifetime is not addressed by the prior art. For example, it is known that a short operational life of a dispenser reduces the cycle time of the production line and process of a panel product. However, a main focus of the prior art is to achieve a good distribution of a reactive foam mixture or to decrease defects of the foam surface after the laydown step of the process. Thus, heretofore, the developments in the field of manufacturing a foam panel are not typically directed to improving the dispenser or the production line and process that includes the dispenser for producing a panel structure. It is desired therefore to provide a production line and a process for manufacturing a multilayer foam panel member using a novel flexible film fluid-dispensing device suitable for dispensing a reactive fluid composition such a foam-forming fluid reaction composition.

SUMMARY

The present invention is directed to a production line and a process for manufacturing a multilayer foam panel member (structure or article) using a novel flexible film fluid-dispensing device.

In one embodiment, the present invention includes a production line for manufacturing a multilayer foam panel member including the following apparatus components: (a) a storage system for components of a foam-forming fluid reactive mixture; (b) a dosing system for transferring the components of the foam-forming fluid reactive mixture to a mixing head for mixing the components of the foam-forming fluid reactive mixture to form the foam-forming fluid reactive mixture; (c) a flexible film fluid dispensing device for receiving the foam-forming fluid reactive mixture; (d) a means for flowing the foam-forming fluid through the flexible fluid dispensing device to dispense the foam-forming fluid; (e) a moving or stationary first bottom sheet substrate for receiving the foam-forming fluid dispensed from the flexible dispensing device; (f) a means for allowing the foam-forming fluid to react, wherein a foam material forms inbetween the first bottom sheet substrate and a second top sheet substrate to form a panel structure, wherein the panel structure comprises the foam material disposed inbetween the top sheet substrate and the bottom sheet substrate; and (g) a means for curing the foam material to form an integral part of the top and bottom sheet substrates and to form a cured panel structure.

In a preferred embodiment, the above production line is a continuous production line and includes a moving bottom sheet substrate; and therefore, this embodiment includes the following component: (h) a cutting means for cutting the cured panel structure into predetermined discrete panel member sections.

In another preferred embodiment, the above production line is a discontinuous production line and includes a stationary or moving bottom sheet substrate; and therefore, this embodiment includes the following component: (h) a means for removing the cured panel structure from the production line.

In still another embodiment, the present invention includes a process for manufacturing the multilayer foam panel article of the present invention including the steps of:

(a) attaching a flexible film fluid-dispensing device to a foam-forming fluid manufacturing line;

(b) flowing a foam-forming fluid reactive mixture from the foam-forming fluid manufacturing line through the flexible film fluid-dispensing device;

(c) dispensing the foam-forming fluid reactive mixture from the flexible film fluid-dispensing device onto a moving first bottom sheet substrate;

(d) allowing the foam-forming fluid reactive mixture to react, as the foam-forming fluid reactive mixture travels on the moving bottom sheet substrate, wherein a foam material forms inbetween a second top sheet substrate and the moving or stationary first bottom sheet substrate;

(e) forming a panel structure comprising the foam material disposed inbetween the top metal sheet and the bottom metal sheet; wherein the foam material is cured to form an integral part of the top and bottom sheet substrates; and, only in the case of a continuous production line, (f) cutting the panel structure of step (e) into predetermined discrete panel sections.

The production line of the present invention provides a multilayer panel article wherein at least one layer of the panel article is a foam, such a polyurethane or polyisocyanurate foam. Some of the advantageous properties of the present invention include, for example: (1) using a flexible film fluid-dispensing device having a low affinity to polyurethane material advantageously increases the flexible film fluid-dispensing device's lifetime which, in turn, provides longer production cycles of panel articles; (2) fouling is reduced by the deformation of the ducts in the flexible film liner member of the flexible film fluid-dispensing device, which also leads to longer production cycles of panel articles; and (3) the flexible film fluid-dispensing device provides a uniform distribution of reactive fluid foam-forming mixture on the width of the bottom sheet substrate of the process equipment which leads to a foam layer of the panel article with fewer defects.

DETAILED DESCRIPTION

Generally, the production line for manufacturing a multilayer foam panel member includes a novel combination of the following apparatus components: (a) a storage system for components of a foam-forming fluid reactive mixture; (b) a dosing system for flowing the components of the foam-forming fluid reactive mixture to a chamber means (also referred to as a mixing head) for mixing the components of the foam-forming fluid reactive mixture to form the foam-forming fluid reactive mixture; (c) a flexible fluid dispensing device for receiving the foam-forming fluid reactive mixture; (d) a means for flowing the foam-forming fluid through the flexible fluid dispensing device to dispense the foam-forming fluid; (e) a moving or stationary bottom sheet substrate for receiving the foam-forming fluid dispensed from the flexible dispensing device; (f) a means for allowing the foam-forming fluid to react, as the fluid travels on the moving bottom sheet substrate, wherein a foam material forms inbetween the moving bottom sheet substrate and a top sheet substrate to form a panel structure, wherein the panel structure comprises the foam material disposed inbetween the top sheet and the bottom sheet; (g) a panel structure comprising the foam material disposed inbetween the top metal sheet and the bottom metal sheet; (h) a means for curing the foam material to form an integral part of the top and bottom sheet substrates and to form a cured panel structure; and in continuous production lines (i) a cutting means for cutting the panel structure into predetermined discrete panel member sections; and in a discontinuous process, (j) a demolding means for demolding a foam panel structure from a mold.

Figure 1:
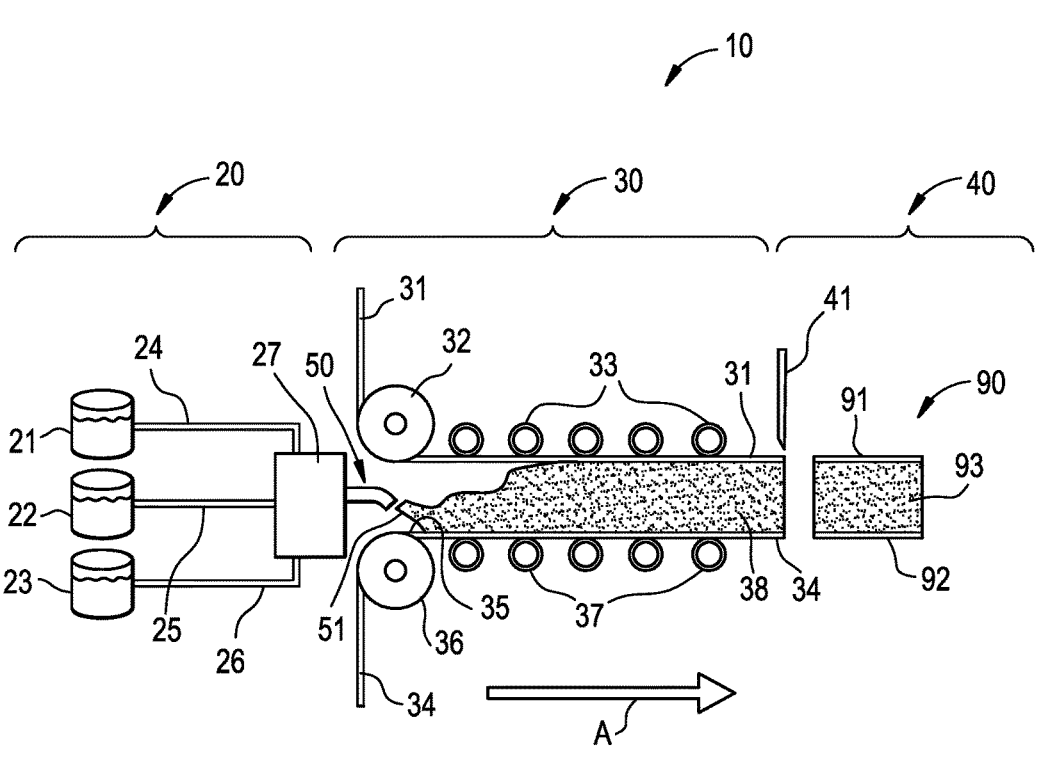
FIG. 1 is a schematic side view of one embodiment of a process flow diagram showing a continuous production line and process for manufacturing a rigid foam multilayer panel member.
Figure 2:
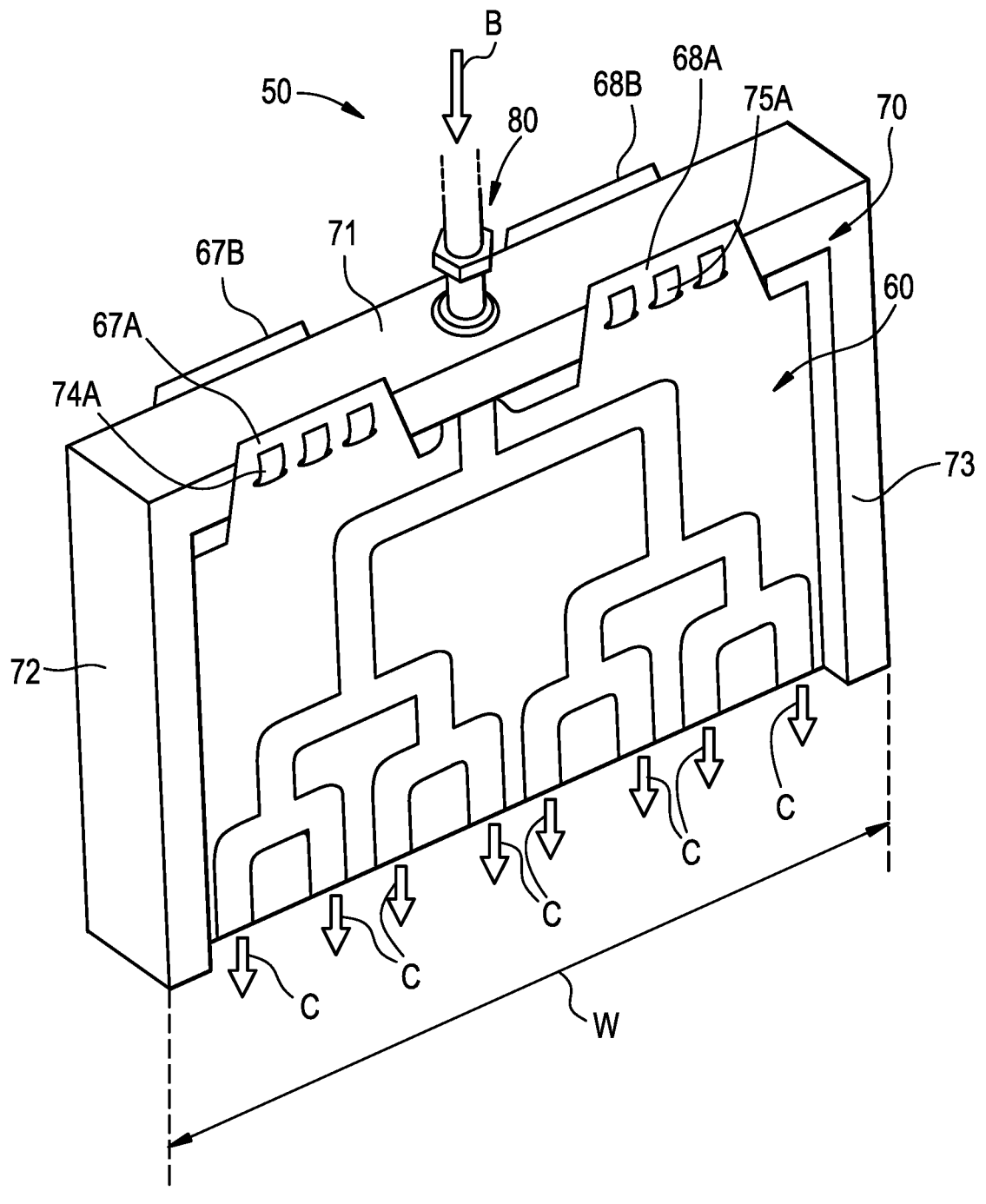
FIG. 2 is a perspective front view of one embodiment of a flexible film fluid-dispensing device useful in the continuous production line of FIG. 1.
Figure 3:
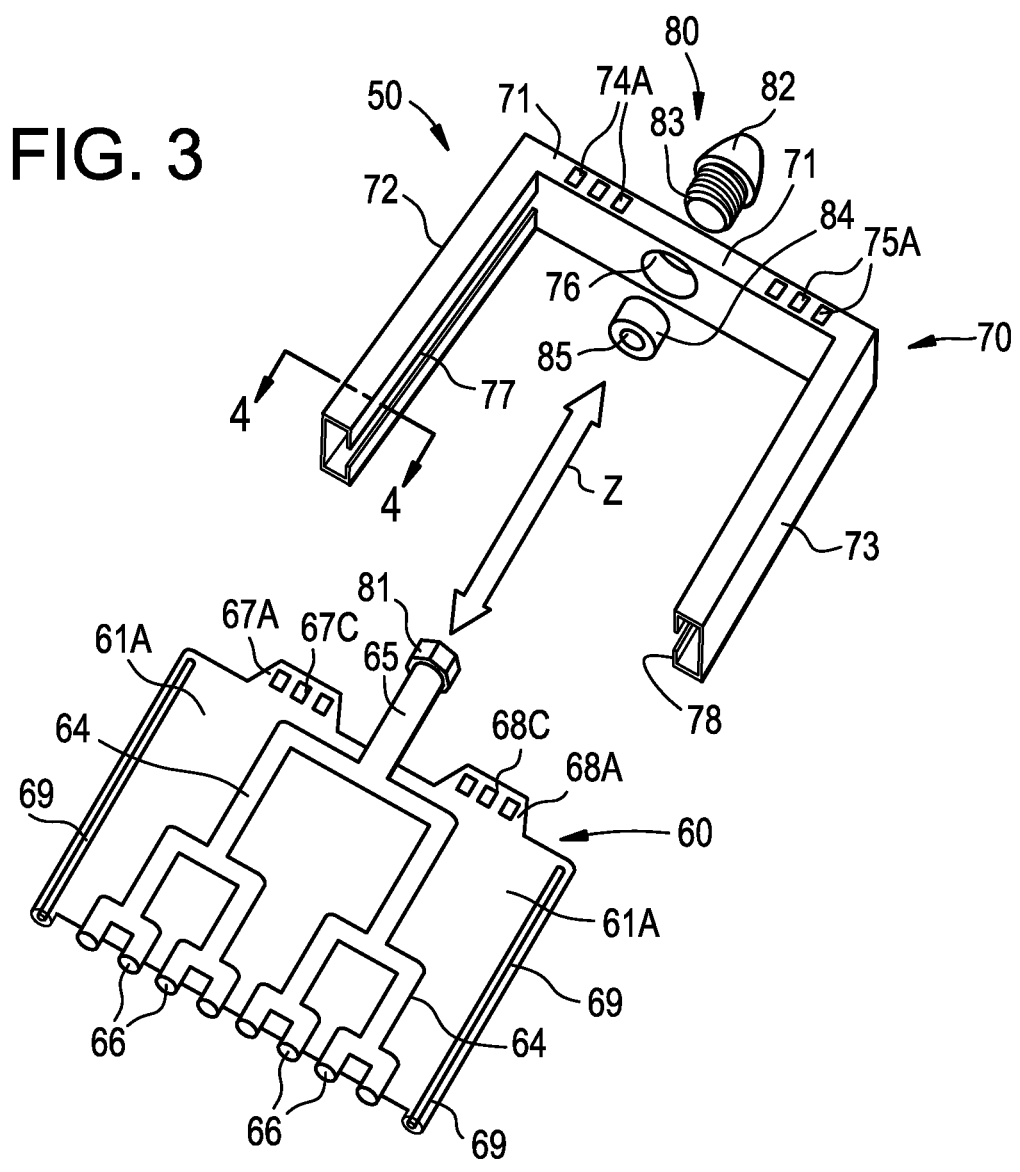
FIG. 3 is a perspective exploded view of the flexible film fluid-dispensing device of FIG. 2.
Figure 4:
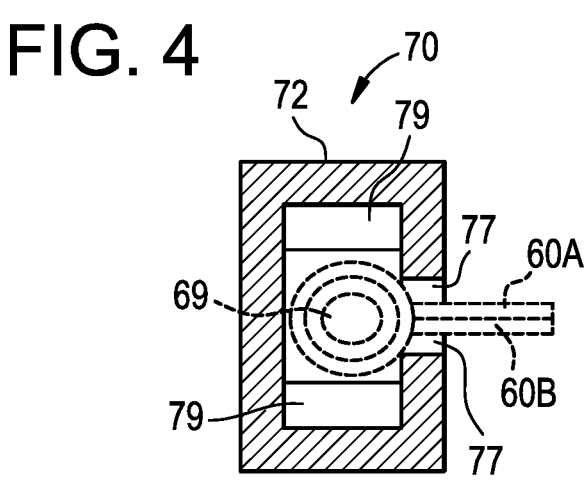
FIG. 4 is an enlarged partial cross-sectional view of a portion of the flexible film fluid-dispensing device of FIG. 3 taken along line 4-4.

The production line of the present invention can be a continuous production line or a discontinuous production line. With reference to FIG. 1, there is shown a continuous production line, generally indicated by reference numeral 10, including a material feed section (or reaction mixture production section) generally indicated by reference numeral 20; a foam-forming section (or foam production section) generally indicated by reference numeral 30; and a cutting section (or panel production section) generally indicated by reference numeral 40. In one embodiment, the present invention production line 10 of FIG. 1 can be used for manufacturing a rigid faced foam sandwich panel article or member generally indicated by reference numeral 90. For example, the continuous production line 10 of the present invention can include a rigid faced double belt lamination (RFDBL) continuous production line. The continuous production line useful for producing a panel article can include, for example, a double band lamination (DBL) process used for producing PUR and PIR foam panels. And, depending on the type of facing (one of the outer layers of the panel) on the panel, the process for fabricating panels can include, for example, a rigid-faced DBL (RF-DBL) process and a flexible-faced DBL (FF-DBL) process. Some preferred embodiments of the continuous production line for fabricating panels include, the RF-DBL and the FF-DBL.

In one preferred embodiment, the multilayer foam sandwich panel member 90 produced using the production line 10 of the present invention includes, for example, a three-layer structure multilayer foam sandwich panel member 90 (see FIGS. 9 and 10) including a top sheet substrate (top layer) 91, a bottom sheet substrate (bottom layer) 92 and a middle foam layer 93 disposed inbetween the top and bottom layers and integrally attached to the top and bottom layers forming the three-layer panel article 90. While the production line 10 can include various pieces of equipment and steps known in the prior art for making panel articles, the present invention production line 10 differs from the prior art by incorporating a novel flexible film fluid-dispensing device generally indicated by reference numeral 50 in FIGS. 1-8.

In another embodiment, the production line of the present invention includes, for example, a discontinuous production line (not shown). The discontinuous production of panel members can be carried out using, for example, molds of defined shapes and sizes. A typical mold for making a rectangular shaped panel member has the following dimensions: a length of the mold is, for example, between 3 m and 12 m, the width of the mold can be in the range of from 1 m and 2 m, and the thickness of the mold can be between 5 cm to 20 cm. In this discontinuous process, the reacting mixture is usually injected in the mold and then the injection hole or holes are closed immediately after the injection. In some cases, the reacting mixture is poured and distributed with the mold opened through a casting rake and then the mold is closed. Afterwards the foaming mass fills the molds, while air is released through venting holes. The continuous process is less flexible but has a much lower cost per square meter of panel.

One of the objectives of the present invention is to provide a process of making a panel article using a novel flexible film dispenser design such that the design of the dispenser is technically superior in function to known prior art dispensers; and which provides an improved manufacturing process for making a panel member and an improved panel member made by the above process. The superior industrial design of the dispenser of the present invention is capable of readily dispensing an emulsion for PIR/PUR panel production using, for example, a RFDBL continuous process.

In a general embodiment, the flexible film dispenser 50 useful in the present invention has several advantageous over other known dispensers including, for example, the dispenser: (1) is made using a flexible film liner and not of a hard inflexible solid block or structure; (2) is made using a heat sealable flexible film liner material; (3) has dimensions such as to cover a panel width; (4) has a flow path that provides an appropriate clearance between the dispenser and the moving or stationary metal bottom sheet substrate on which the reactive fluid mixture from the dispenser has flowed thereon; (5) is made using a flexible film liner that can encompass one layer or multiple layers; and (6) is made using a flexible film liner that can be laminated or coextruded.

In a preferred embodiment, the dispensing device or dispenser 50 useful in the production line 10 of the present invention can include, for example, the dispenser described in Italy Patent Application Serial No. 102019000015725, filed on Sep. 6, 2019. An embodiment of the dispenser 50 is shown in FIGS. 1-8 and described in the above patent application.

With reference to FIGS. 2-8, and as described in the above patent application, the fluid dispenser 50 includes: (a) a flexible film liner, generally indicated by reference numeral 60; (b) a rigid frame member, generally indicated by reference numeral 70; and (c) a connection means or connector generally indicated by reference numeral 80. The flexible film liner 60 can include, for example, a liner made by a heat-sealing process wherein the heat sealing provides a flow path for the fluid to be dispensed; and the flow passages are defined by the negative impression of the sealing die. The rigid frame 70 of the dispenser 50 is used, for example, for holding the flexible film liner 60 in place during the operation of the dispenser 50. And, the connection means or connector 80 of the dispenser 50 is used, for example, for connecting the liner 60 to the outlet pipe(s) of a fluid production line.

In one preferred embodiment, the flexible film liner 60 of the dispenser 50 useful in the present invention is, for example, a flexible film member described in Italy Patent Application Serial No. 102019000015716, filed on Sep. 6, 2019 by Dow Global Technologies LLC. For example the liner 60 can be made of multiple layers wherein at least one layer is made of heat-sealing material to be heat sealed by a heat-sealing process wherein the heat sealing provides a flow path in the form of a series of ducts or passageways 64 in liner 60 for fluid to be dispensed from the dispenser 50. Typically, the flow passages 64 are defined by the negative impression of the sealing die when forming the flexible film liner 60.

Figure 5:
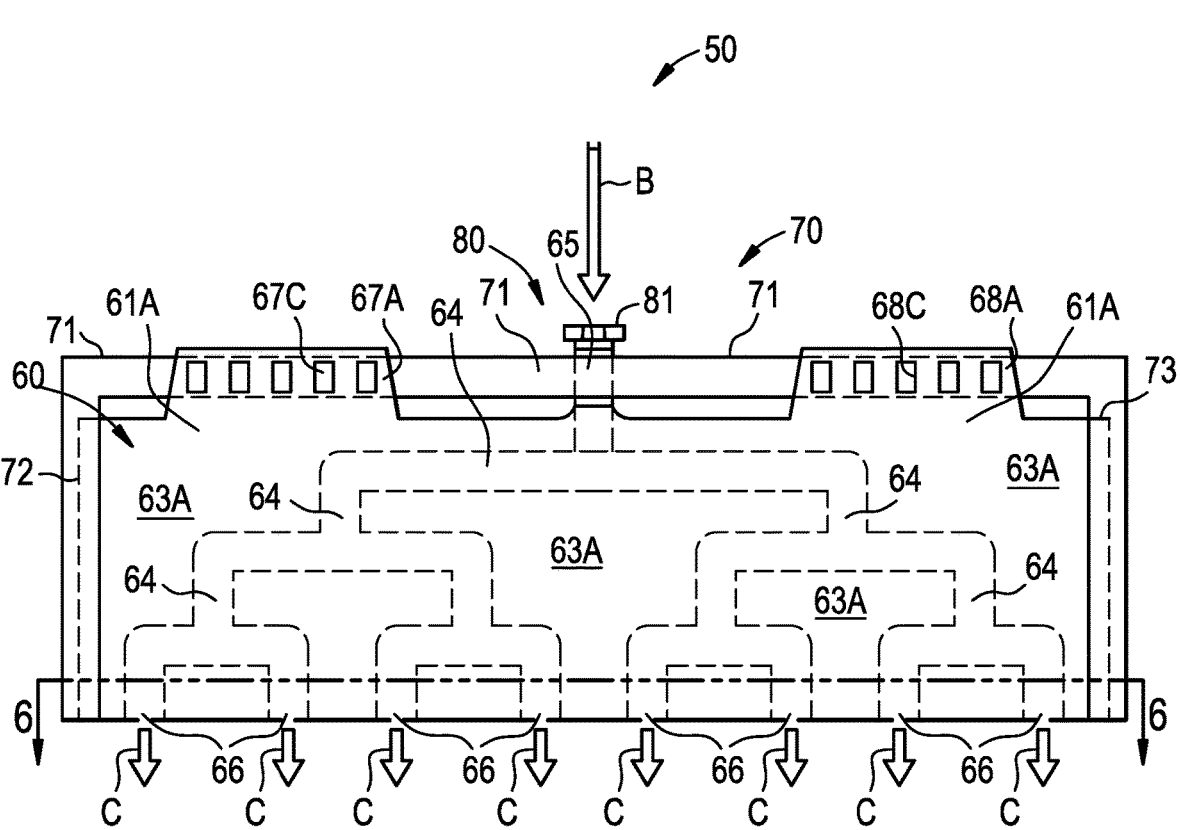
FIG. 5 is a front view showing one embodiment of a flexible film fluid-dispensing device useful in the continuous process of FIG. 1.
Figure 6:
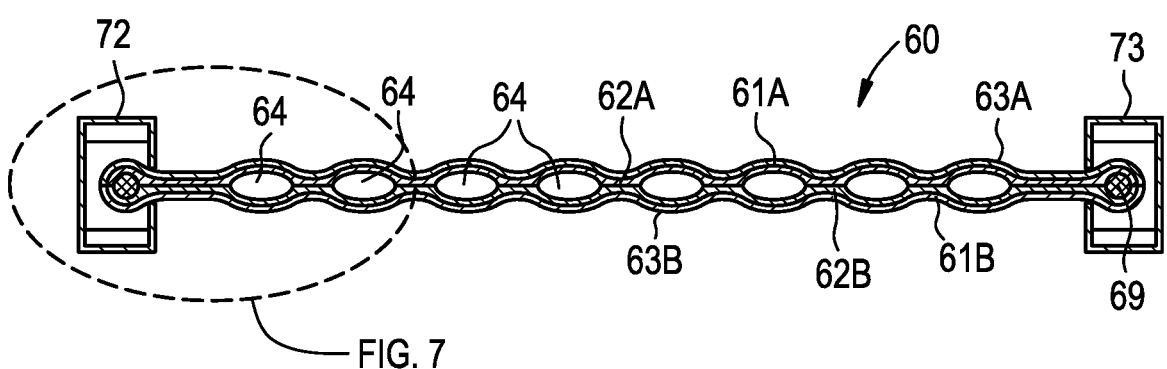
FIG. 6 is a cross-sectional view of the flexible film fluid-dispensing device of FIG. 5 taken along line 6-6.
Figure 7:
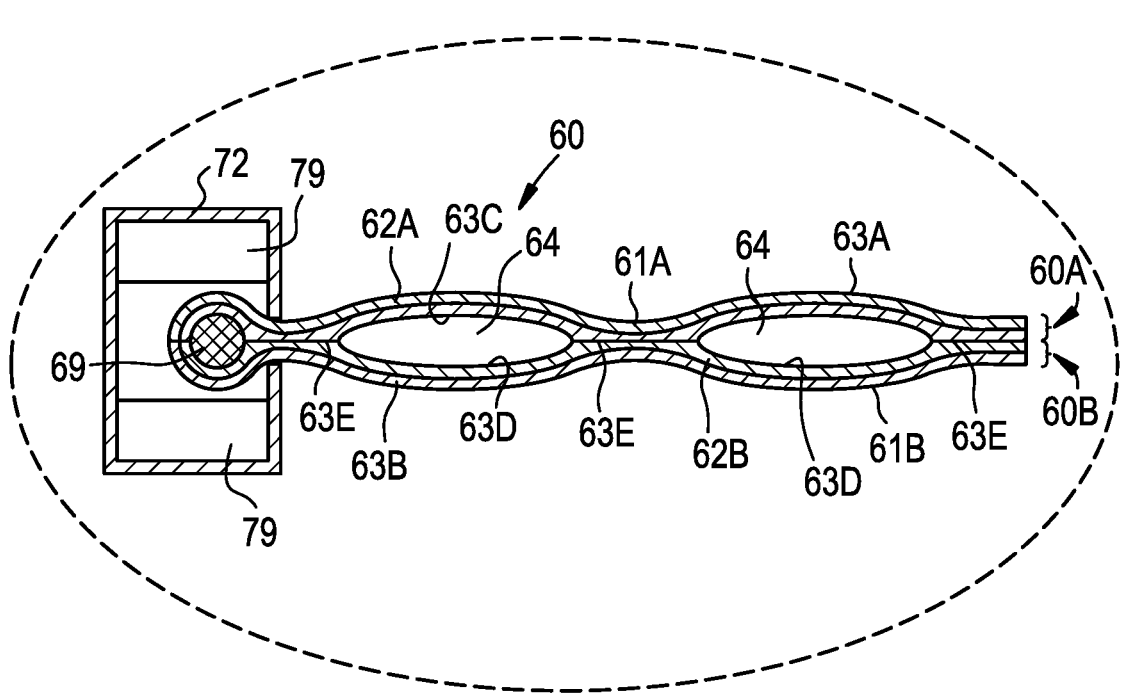
FIG. 7 is an enlarged view of a portion of the cross-sectional view of the flexible film dispensing device of FIG. 6 showing the ducts in the flexible film liner member of the flexible film fluid-dispensing device deflated when the flexible film fluid-dispensing device is not in use with liquid fluid flowing inside the ducts.
Figure 8:
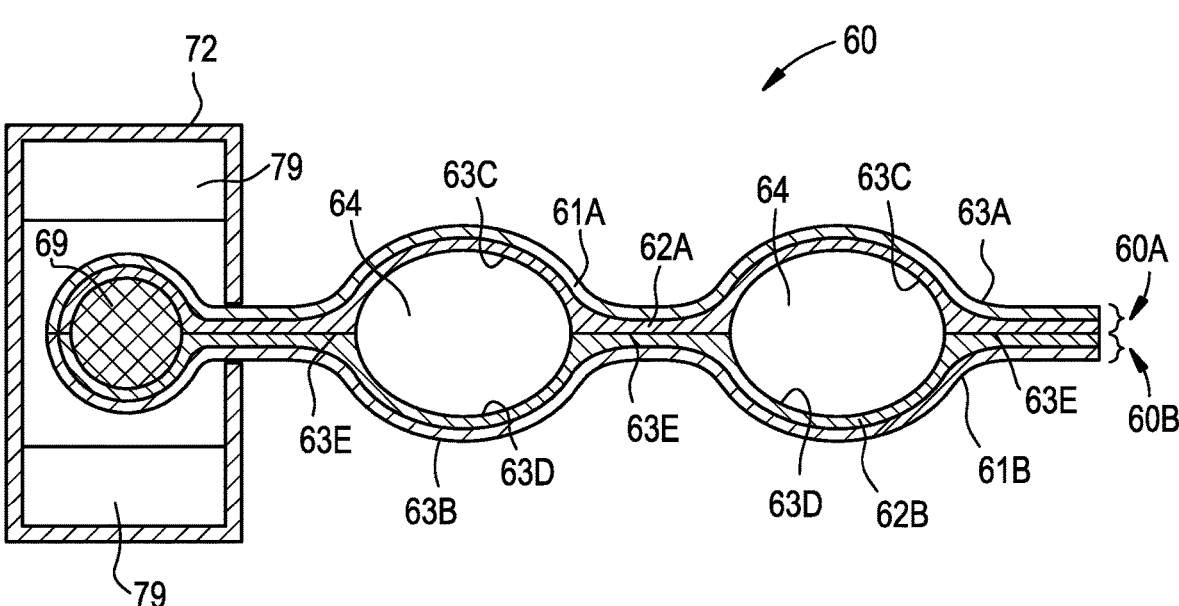
FIG. 8 is an enlarged view of a portion of the cross-sectional view of the flexible film fluid-dispensing device of FIG. 7 showing the ducts in the flexible film liner member of the flexible film fluid-dispensing device being inflated with liquid fluid flowing inside the ducts during usage of the flexible film fluid-dispensing device.

In a preferred embodiment, the flexible film liner 60, which is held in place by the rigid frame 70, includes at least two areas, (i) a heat-sealed area (FIG. 5 shows one side of the flexible film liner 60 showing the heat-sealed area 63A)

and (ii) a flow path area in the form of a pattern of a series of inflatable ducts 64 for a fluid or emulsion to flow therethrough. The liner 60 and the frame 70 are connected to a production line by means of the connector 80 for feeding a flow of fluid into, and through, the dispenser 50.

The rigid frame 70 of the dispenser 50 for holding the flexible film liner 60 in place can include any shape frame member such as square, triangular, reactangular, trapasoidal, and the like. The frame 70 can also include any size of the above shape as desired for applicability for a particular production line or application.

The connection means or connector 80 of the dispenser 50 for connecting the dispenser 50 to the outlet pipe of a fluid manufacturing line (not shown) can include any conventional connecting means such as nuts and bolts, threaded pipes and the like. In a preferred embodiment, the connector 80 is a hermetic connector. In one embodiment, a flexible film dispenser 50 is connected to a manufacturing line via the hermetic connector 80 such that a foam-forming fluid can be fed into the dispenser 50, passed through the dispenser 50, and dispensed or deposited onto a surface of a substrate.

With reference to FIG. 1, the dispensing device or dispenser 50 useful in the present invention bridges the material feed section 20 and the foam-forming section 30 of the production line 10. The material feed or reaction mixture production section 20 of the production line 10 includes, for example, a multi-component dosing unit comprising several vessels including for example vessels 21, 22 and 23 which contain the foam-forming reactive components to be mixed and dispensed. The vessels 21-23 include supply lines 24-26, respectively; the supply lines can be a series of pipes 24-26, and pumps (not shown). The contents of the pipes 24-26 flow into a high-pressure mixing unit or mixing head 27 for receiving and mixing the fluid components from the vessels 21, 22 and 23. The three vessels 21-23, and supply lines 24-26 from vessels 21-23, respectively, of the reaction mixture production section 10 are used for supplying reactive components to the mixing head or unit 27 for forming a reactive foam-forming mixture fluid which is then sent to the dispensing device 50 connected to the mixing head or unit 27.

The foam-forming or foam production section 30 of the continuous process 10 includes, for example, a top film sheet substrate 31 and the bottom film sheet substrate 34 which move through the foam production section 30 via a double band.

In a preferred embodiment shown in FIG. 1, the dispenser 50 is incorporated into the continuous production line 10; and the dispenser 50 receives a foam-forming fluid reactive mixture 51 from the mixing head 27 through at least one inlet 65 of ducts 64 in the liner 60 of the dispenser 50; and the reactive fluid mixture 51 is flowed through the dispenser 50 through the duct system in the dispenser and then, the mixture exits the dispenser from a plurality of outlets 66 in the dispenser. The foam-forming reactive mixture 51 is fed from the dispenser 50 to the surface of a substrate as the fluid 51 exits the dispenser 50. The liquid fluid 51 flowing and being dispensed from the dispenser 50 is "laid down" (i.e. poured) onto a substrate, for example, the substrate can be a moving bottom facing layer or bottom sheet substrate 34 of the foam-forming section 30 of the production line 10.

In a preferred embodiment, the process of "laying down" the reactive mixture fluid 51 can be summarized in accordance with the following steps: (i) flowing the foam-forming fluid through the dispenser 50; (ii) dispensing the foam-forming fluid from the dispenser 50 onto a moving, optionally heated, bottom or lower sheet substrate 34; (iii) allowing the foam-forming fluid 51 to react, as the fluid travels on the moving bottom sheet substrate 34, typically in a horizontal direction, to form a foam 38 inbetween a top sheet substrate (top layer) 31 and the bottom sheet substrate (bottom layer) 34; (iv) allowing the foam to contact the top layer 31 and bottom layer 34 and to fill in the gap between the top and bottom layers, such that the foam is integrally connected to the top and bottom layers forming a panel structure 38 comprising the foam material disposed inbetween the top and bottom facing layers 31 and 34.

The dispenser 50, connected to the mixing head 27, is used for dispensing the mixed reactive fluid mixture 51 from the mixing head 27 onto the laydown surface area 35 of the moving bottom sheet substrate 34 in the form-forming section 30. The dispenser 50 dispenses or distributes the reactive fluid 51 evenly, homogeneously, and uniformly across the full width of, and onto the laydown surface area 35 of the bottom sheet substrate 34. The bottom sheet substrate 34 moves in the direction indicated by arrow A. Auxiliary equipment such as pumps (not shown) can also be included in the production line 10.

Once the mixing head 27 mixes the components coming from the different lines 24-26 forming the reactive mixture 51, the components in the reactive mixture 51 begin to react. Thereafter, the dispensing device 50 dispenses the reactive mixture 51 uniformly and homogeneously onto the surface of the moving bottom sheet substrate 34 and across the entire width of the moving bottom sheet substrate 34. As the fluid mixture 51 moves across the foam production section 30, the components in the reactive mixture 51 react to form a rigid foam material 38.

The foam material 38 is allowed to contact the top and bottom layers 31 and 34, respectively, to fill in the gap between the top layer, such that the foam is integrally connected to the top and bottom layers forming a panel structure comprising the top sheet substrate 31 which becomes the top layer 91, the bottom sheet substrate 34 which becomes the bottom layer 92, and the foam material 38 disposed inbetween the top and bottom sheet substrates or layers which becomes the middle layer 93 of the panel member 90 when the structure from the foam production section 30 is cut in the panel production section 40 with cutting tool 41.

Figure 9:
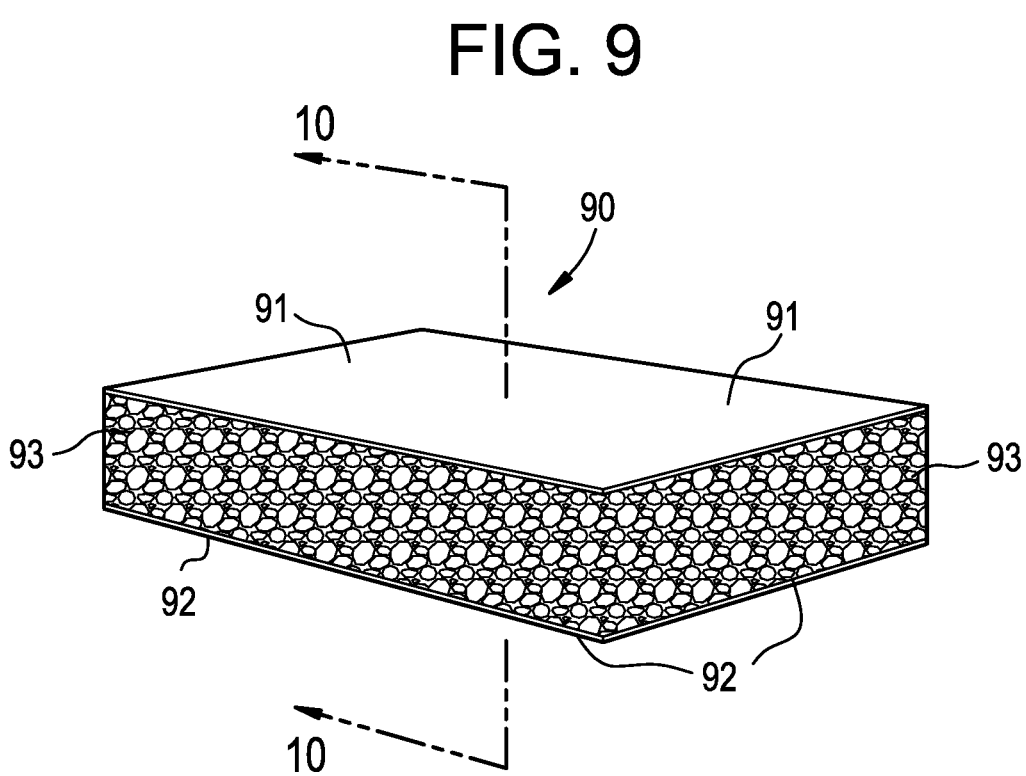
FIG. 9 is a prospective view of a rigid foam panel article prepared using the production line of FIG. 1.
Figure 10:
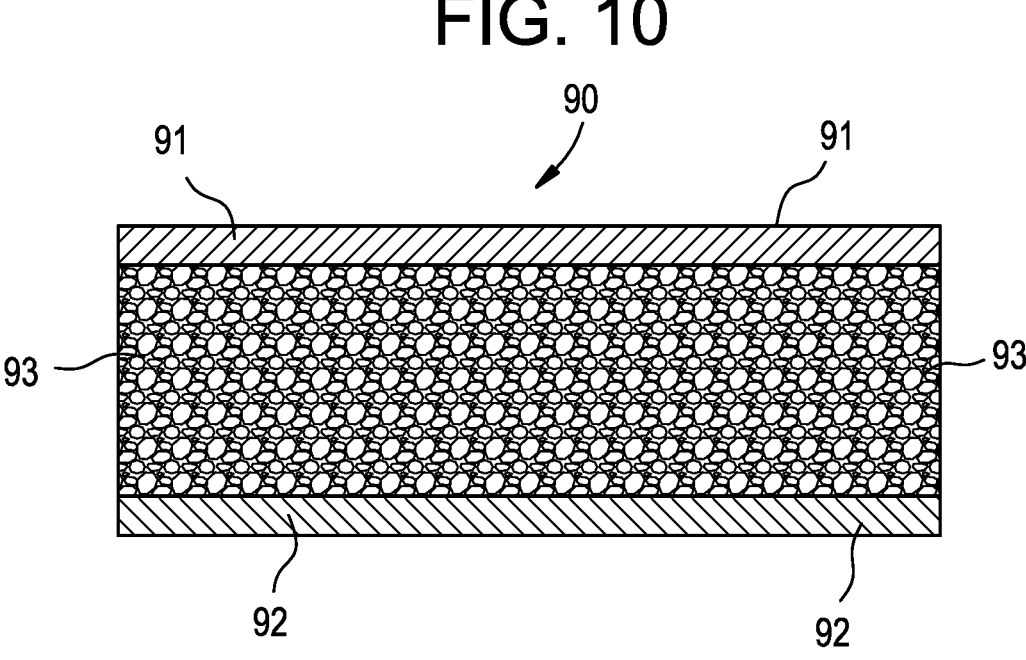
FIG. 10 is a cross-sectional side view of the panel article of FIG. 9 taken along line 10-10.

Generally, the free rising foam touches the top facing slightly before the gel time of the reacting mixture. In general, the difference between the gel time and the contact time is kept between 0 s and 15 s in one embodiment, between 3 s and 10 s in another embodiment and between 4 s and 7 s in still another embodiment. This permits the foam being formed to intimately adhere itself to the top and bottom sheet substrates. Once the foam expands and intimately adhere to the top and bottom layers toward the end of the process in section 30, the formed foamed panel is cut using a cutting tool 41. The panels are cut into predetermined discrete panel sections 90 as shown in FIGS. 1, 9 and 10.

The reactive liquid fluid 51 deposited on the surface of the moving bottom sheet substrate 34 moves through the length of the foam production section 30 for a sufficient time and at a sufficient speed for the components in the reactive fluid 51 to sufficiently react to form the foam material 38 toward the end of the foam production section 30. For example, a sufficient speed and time of the moving sheet 34 is used to allow the foam-forming fluid to react, as the fluid travels on the moving sheet 34 typically in a horizontal direction (shown by directional arrow A in FIG. 1), to form a foam inbetween a top sheet substrate (top layer) 31 and the bottom sheet substrate (bottom layer) 34. Typical line speeds for the moving sheet 34, when using a RFDBL process, can be, for example, from 4 m/min to 15 m/min in one embodiment, from 4 m/min to 12 m/min in another embodiment, and from 4 m/min to 10 m/min in still another embodiment. When using a FFDBL process, the line speeds can be, for example, from 4 m/min to 60 m/min in one embodiment, from 4 m/min to 50 m/min in another embodiment, and from 10 m/min to 25 m/min in still another embodiment.

In another embodiment, the moving bottom sheet substrate 34 can be heated with a heat means (not shown), and also the reactive fluid 51 can be heated. The heat cures the foam-forming mixture 51 as the mixture is transported through the foam-forming section 30 to the cutting section 40 via the moving bottom sheet 34.

After passing through section 30, the panel structure 38 is passed to a panel cutting section 40. In the cutting section 40 of the production line 10, the foam panel structure 38 produced in section 30 is cut into discrete panel sections of a desired length using a cutting tool 41. Cutting of the foam panel structure 38 into sections produces the cut foam panel article, generally indicated by reference numeral 90 in FIGS. 1, 9, and 10. After cutting the panel structure 38 into panel members 90, the produced panels 90 are cooled (not shown) to finalize the curing of the foam in the middle foam layer 93 of the panels 90 before the panels 90 are further processed.

After cutting the formed foamed panel into predetermined discrete panel sections, the panels can be subjected to additional processing steps. For example, although not shown in FIG. 1, additional optional processing units or equipment can be added to the production line 10. For example, the cut panels 90 can be stacked and packed by forwarding the panels 90 to further processing units or equipment such as an apparatus for cooling the cut discrete panel sections, an apparatus for stacking the cut discrete panel sections, and an apparatus for wrapping the cut discrete panel sections with shipping film to provide a stack of panel sections for shipping.

In other embodiments, such as in the case of a rigid-faced DBL at the beginning of, and prior to, the production line, the production line can also include a profiling section, a pre-heating section, and/or a pre-treating section (not shown). For example, the pre-treating section can include corona treatment of the sheet substrates such as metal sheet substrates; and/or an adhesion promoting layer can be deposited on the metal sheet substrates.

Foam panels members 90 can be produced via the production line 10 of the present invention which can be a continuous or a discontinuous process. The production line 10 shown in FIG. 1 is a continuous process. In one general embodiment, the process of the present invention for manufacturing a panel article includes, for example, the steps of: (a) providing a flexible film dispenser; (b) attaching the flexible film dispenser to a manufacturing line via a hermetic connector; (c) flowing foam-forming fluid through the dispenser; (d) dispensing the foam-forming fluid from the dispenser onto a moving bottom belt of a bottom or lower sheet substrate; (e) allowing the foam-forming fluid to react, as the fluid travels on the moving belt typically in a horizontal direction, to form a foam inbetween a top sheet substrate (top layer) and the bottom sheet substrate (bottom layer); (f) allowing the foam to contact the top and bottom layers and to fill in the gap between the top and bottom layers, such that the foam is integrally connected to the top and bottom layers forming a panel structure comprising the foam material disposed inbetween the top and bottom layers; and (g) cutting the formed foamed panel from step (f) into predetermined discrete panel sections.

In another embodiment, the process of the present invention for manufacturing a panel article includes, for example, the steps of: (a) providing a flexible film dispenser; (b) attaching the flexible film dispenser to a mixing head via a hermetic connector; (c) inserting the dispenser in the mold; (d) flowing foam-forming fluid through the dispenser; (e) dispensing the foam-forming fluid from the dispenser into the mold; (f) removing the dispenser from the mold; (g) allowing the foam-forming fluid to react, as the fluid fills the mold, to form a foam inbetween a top sheet substrate (top layer) and the bottom sheet substrate (bottom layer); (h) allowing the foam to contact the top and bottom layers and to fill in the gap between the top and bottom layers, such that the foam is integrally connected to the top and bottom layers forming a panel structure comprising the foam material disposed inbetween the top and bottom layers; and (i) demold the panel.

The temperatures used for processing a PUR foam and a PIR foam are different and can vary. In general, for example, when processing a PUR foam, the top and bottom sheet substrates such as metal sheets, can be at a temperature of from 20° C. and 80° C. in one embodiment, from 30° C. to 70° C. in another embodiment, and from 30° C. to 60° C. in still another embodiment. For the components used to make a PUR foam, for example, the temperature of the components can be from 20° C. and 40° C. in one embodiment, from 20° C. to 30° C. in another embodiment, and from 25° C. to 35° C. in still another embodiment. The pressure for operating the mixing head can be from 20 bar to 200 bar in one embodiment, from 50 bar to 170 bar in another embodiment, and from 110 bar to 170 bar in still another embodiment.

In another embodiment, the process for manufacturing a panel article using the production line 10 of the present invention can include, for example, the additional step of pre-treating the metal facings to be attached to the foam. The pre-treatment of the facings can include, for example, one or more of the following pre-treatments: decoiling, corona treatment, profiling, heating, and adhesion promoter layer laydown. After dosing the reactive components, the components reach the mixing chamber or mixing head, where a high-pressure mixing of the components can be performed to produce the foam-forming fluid reactive mixture (for example, normally all of components are mixed in two separate streams and then the two separate streams are combined to form the reactive mixture).

The use of the flexible film fluid-dispensing device 50 and the production line 10 of the present invention provides a panel member 90 with fewer defects and a more homogenous foam middle layer of the panel member 90 than using a conventional dispenser. For example, some of the advantageous properties exhibited by the panel member 90 made by the above-described process of the present invention can include, for example, the panel member 90 has: (1) a foam middle layer 93 that is homogeneous, and (2) a foam middle layer 93 that has a reduced density. For example, all the important properties of the foam middle layer, e.g. thermal conductivity, mechanical strength and density, can have a normalized standard deviation over the width of the panel from 0% to 15% in one embodiment, from 0% to 10% in another embodiment, and from 0% to 5% in still another embodiment. In addition, having a more uniform distribution of the foam-forming reactive mixture by the dispenser also allows a manufacturer the capability of reducing the overpacking, and therefore, the final applied density of the panel, which in turn has a beneficial impact on the final cost of the panel. Foam overpacking is described as the amount of PUR/PIR foam exceeding the minimum amount of foam needed to fill the panel thickness. For example, the overpacking of the foam middle layer can be from 0% to 5% in one embodiment, from 5% to 8% in another embodiment, and from 8% to 15% in still another embodiment.

One of the major applications of PUR and PIR insulation foams is in commercial buildings using steel sandwich panels or flexible-faced sandwich panels. The sandwich panels of the present invention are advantageously used in applications that require one or more of the following properties: thermal insulation, mechanical strength, fire retardancy, and building efficiency. In some embodiments, the sandwich panels of the present invention are useful in both industrial and residential applications, and can be used, for example, as wall and roof panels, for cold stores insulation, for doors of any type and shape, for windows for sliding shutters, and the like.

What is claimed is:

1. A production line for manufacturing a multilayer foam panel member comprising:

(a) a storage system for components of a foam-forming fluid reactive mixture;

(b) a dosing system for flowing the components of the foam-forming fluid reactive mixture to a chamber for mixing the components of the foam-forming fluid reactive mixture to form the foam-forming fluid reactive mixture;

(c) a flexible fluid dispensing device for receiving the foam-forming fluid reactive mixture;

the flexible fluid dispensing device including:

i) a flexible multilayer film having:
at least one fluid inlet aperture;
a plurality of fluid outlet apertures; and
a series or pattern of flexible fluid flow path ducts defined within the flexible multilayer film that connect the least one fluid inlet aperture with the plurality of fluid outlet apertures;

ii) a rigid frame disposed at least partially about a perimeter of the flexible multilayer film and in contact with side edges of the flexible multilayer film; and iii) a hermetic connector positioned on the rigid frame for connecting the at least one fluid inlet aperture to an outlet of the chamber;

wherein:

the foam-forming fluid reactive mixture enters the at least one fluid inlet aperture, flows through the flexible fluid dispensing device, and exits the plurality of fluid outlet apertures to dispense the foam-forming fluid reactive mixture onto a surface of a first bottom sheet substrate;

the first bottom sheet substrate moves and receives the foam-forming fluid reactive mixture dispensed from the flexible fluid dispensing device;

the foam-forming fluid reactive mixture to reacts and travels on the first bottom sheet substrate and a foam material forms between the first bottom sheet substrate and a second top sheet substrate to form a panel structure; and the foam material cures to form the multilayer foam panel member comprising the second top sheet substrate, the first bottom sheet substrate, and the foam material cured integrally therebetween.

2. The production line of claim 1, wherein each of the first bottom sheet substrate and the second top sheet substrate is a metal substrate.

3. The production line of claim 1, wherein the foam material is a polyurethane foam.

4. The production line of claim 1, wherein the foam material is a polyisocyanurate foam.

5. The production line of claim 1, wherein the production line is a double band lamination production line.

6. The production line of claim 1, wherein the components of the foam-forming fluid reactive mixture include an isocyanate component and an isocyanate-reactive component.

7. A process for manufacturing the multilayer foam panel member using the production line claimed in claim 1.

8. The process of claim 7 wherein the foam-forming fluid reactive mixture is dispensed during a double band lamination production process to provide an even distribution of the foam-forming fluid reactive mixture from the flexible fluid dispensing device onto the surface of the first bottom sheet substrate.

9. The production line of claim 1, wherein the flexible multilayer film includes at least one layer made of a heat-sealing material that is heat sealed such that the at least one layer defines the series or pattern of flexible fluid flow path ducts within the flexible multilayer film.

10. The production line of claim 1, wherein the rigid frame is coupled to the side edges of the flexible multilayer film.

11. The production line of claim 1, wherein the side edges of the flexible multilayer film are distinct from portions of the flexible multilayer film that define the series or pattern of flexible fluid flow path ducts defined within the flexible multilayer film, the at least one fluid inlet aperture, and the plurality of fluid outlet apertures.

12. The production line of claim 1, wherein the series or pattern of flexible fluid flow path ducts defined within the flexible multilayer film are branched.

13. The production line of claim 1, wherein the at least one fluid inlet aperture is positioned on a front end of the flexible multilayer film.

14. The production line of claim 1, wherein the plurality of fluid outlet apertures are positioned on a back end of the flexible multilayer film.

15. The production line of claim 1 further comprising a cutting tool for cutting the multilayer foam panel member into predetermined discrete panel sections.

* * * * *